United States Patent [19]

McCormick et al.

[11] Patent Number: 4,769,837
[45] Date of Patent: Sep. 6, 1988

[54] DEVICE FOR ADDING INTERCOM FUNCTIONS TO A PHONE SYSTEM

[75] Inventors: Peter E. McCormick; Keith R. Crawford, both of Dallas, Tex.

[73] Assignee: EOA Systems, Inc., Dallas, Tex.

[21] Appl. No.: 45,321

[22] Filed: May 4, 1987

[51] Int. Cl.⁴ .......................................... H04M 1/72
[52] U.S. Cl. .................................... 379/393; 379/160
[58] Field of Search ............... 379/156, 157, 158, 159, 379/160, 355, 386, 393

[56] References Cited

U.S. PATENT DOCUMENTS

| | | | |
|---|---|---|---|
| 4,088,846 | 5/1978 | McEowen | 379/159 |
| 4,135,063 | 1/1979 | Bosen | 379/159 |
| 4,158,110 | 6/1979 | Ullakko et al. | 379/159 |
| 4,538,031 | 8/1985 | Benning et al. | 379/105 X |
| 4,572,928 | 2/1986 | Nishimura et al. | 379/159 |
| 4,578,540 | 3/1986 | Borg et al. | 379/355 X |
| 4,588,861 | 5/1986 | Teich | 379/159 |
| 4,674,115 | 6/1987 | Kaleita et al. | 379/386 X |

FOREIGN PATENT DOCUMENTS

| | | | |
|---|---|---|---|
| 1556399 | 11/1979 | United Kingdom | 379/160 |
| 2058518 | 4/1981 | United Kingdom | 379/160 |
| 2060316 | 4/1981 | United Kingdom | 379/160 |
| 2157920 | 10/1985 | United Kingdom | 379/159 |

OTHER PUBLICATIONS

Carter, "A Versatile New Intercom System", Bell Laboratories Record, Mar. 1958, pp. 81-85.

*Primary Examiner*—Keith E. George
*Attorney, Agent, or Firm*—Daniel V. Thompson

[57] ABSTRACT

A device for adding intercom functions to a residential or small business phone system uses existing telephone equipment and wiring. The device attaches to the incoming telephone line to switch telephone calls and generate user coded ringing signals. The invention allows the user to simultaneously use existing telephone equipment as an intercom system and for normal outside telephone use.

3 Claims, 3 Drawing Sheets

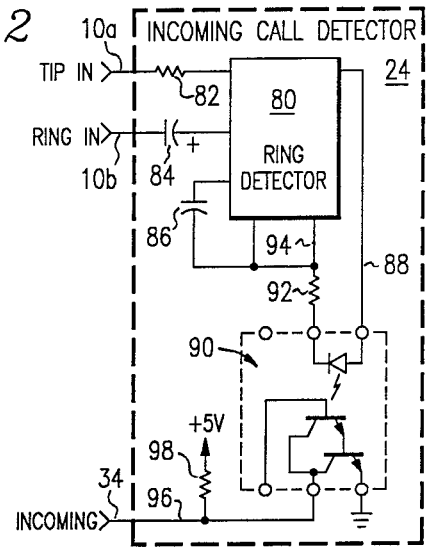
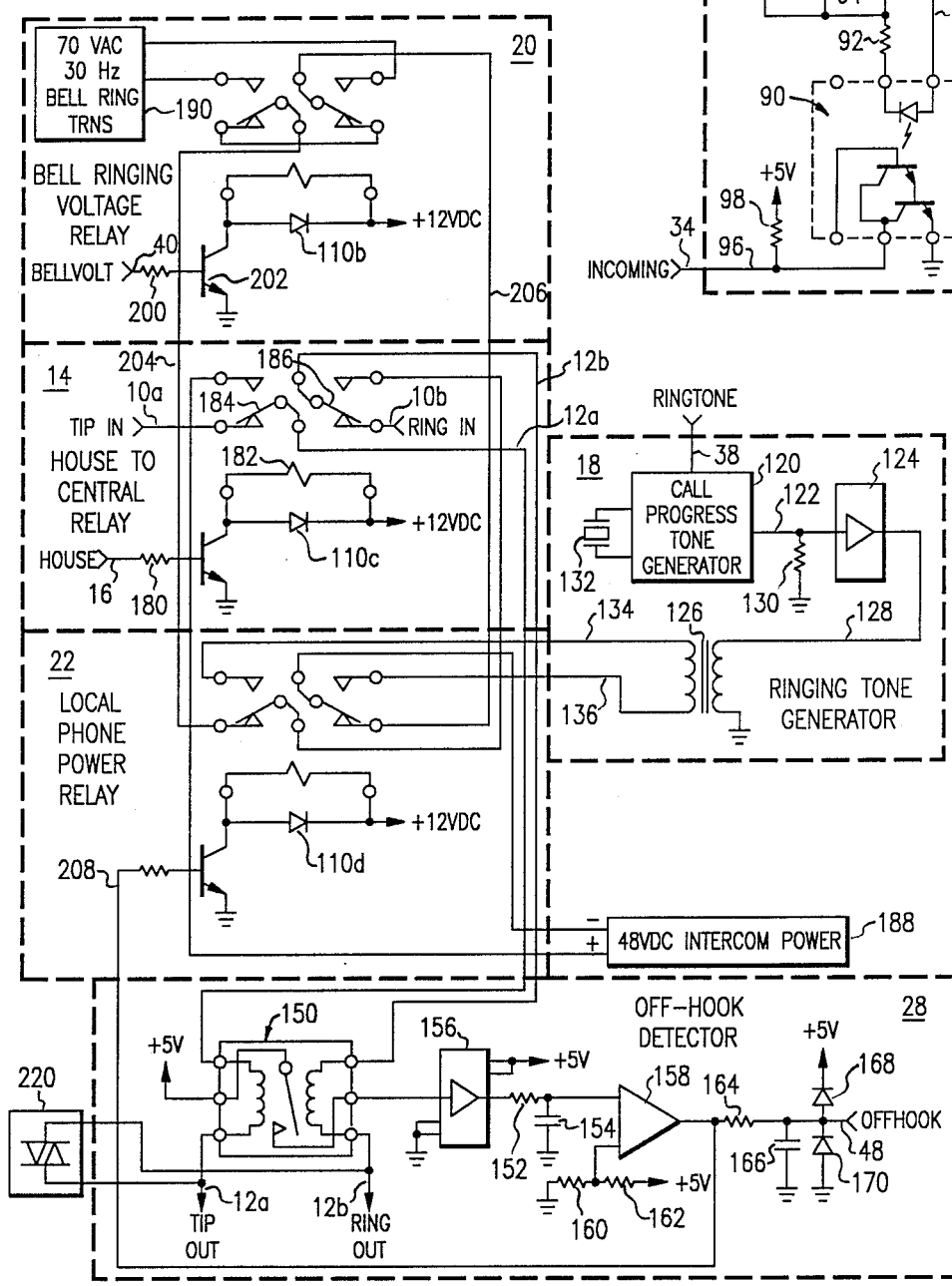
FIG. 2
FIG. 4

4,769,837

DEVICE FOR ADDING INTERCOM FUNCTIONS TO A PHONE SYSTEM

TECHNICAL FIELD

This invention relates to telephone system accessories, and more particularly to a device for adapting a standard telephone system having an incoming telephone line and several extensions for use as an intercom system.

BACKGROUND OF THE INVENTION

Residences and small businesses often have the need for an inexpensive intercom system. Conventional intercom systems are usually either built into a residence at great expense, or they are added later and must be wired in. These systems are confusing to use and add clutter and confusion to a house. Add on intercom systems tend to be unsightly, and wiring is difficult at best.

Sophisticated residential phone systems which have intercoms built in are available. These systems are expensive and require that special wiring be installed so that calls can be directed to specific phones. It is also possible that specially equipped telephones can be made to ring individually over existing house wiring. Basically, these systems are the equivalent of those used in small businesses. No system now exists whereby a user can readily adapt existing low cost telephone extensions and wiring to make intercom calls within the residence or small business.

SUMMARY OF THE INVENTION

The present invention provides intercom functions to a residential or small business phone system using existing telephone equipment and wiring. The invention connects to the incoming telephone line to switch telephone calls and generate user coded signals. The invention allows the user to simultaneously use the existing telephone equipment as an intercom system and for normal outside telephone use. The invention is a highly cost effective alternative to existing intercom systems because it operates using existing, in place telephone equipment and wiring. Because the invention does not require any additional telephone wiring or equipment, the cost of install is greatly reduced.

The device of the present invention is connected between extension telephones in a conventional house or business which operate over two wires called "tip" and "ring" and the incoming telephone company line. Each telephone's "tip" and "ring" wires normally tap directly into the "tip" and "ring" wires from the telephone company for operation. The telephones are made to ring with intercom signal ring burst sequences by supplying approximately 30 hertz at 70 VAC across the "tip" and "ring" wires while the telephones are all on-hook by way of a bell ringing voltage relay in the invention. The specific ring burst sequence is selected by the intercom user pressing key codes into his extension telephone, which codes are decoded by a tone decoder in the invention. Applying ringing voltage while a telephone in the invention is off hook would more than likely damage the telephone, so a local phone power relay is wired to disconnect the bell ringing voltage relay when an off-hook condition is detected by an off-hook detector. Applying 48 VDC from a local phone power supply in the invention to the "tip" and "ring" wires through a dropping resistor to simulate the central station current limiting resistor and line resistance produces the voltage required to power all telephones for intercom conversations. Incoming calls are put on "hold" by a hold relay in the invention which puts a load resistance across the "tip" and "ring" wires thus simulating a phone being off hook. An incoming bell ringing voltage is detected by a incoming call detector in the invention which is optically and capacitively coupled to the high "tip" and "ring" ringing voltage coming into the house. Tones generated by a ringing tone generator are then sent through the telephone handset earpieces by using a dual tone multifrequency (DTMF) signal generating integrated circuit and coupling this signal to the "tip" and "ring" wires through an isolation transformer. All control signals and relays are controlled by a control computer (CPU), which acts upon signals coming in from the off-hook detector, incoming call detector, and tone decoder.

BRIEF DESCRIPTION OF THE DRAWINGS

FIG. 2 is a schematic of the incoming call detector section of the device;

FIG. 4 is a schematic of the bell ringing voltage relay, house to central relay, local phone power relay, ringing tone generator, and off-hook detector sections of the device;

DETAILED DESCRIPTION

Figure 1:
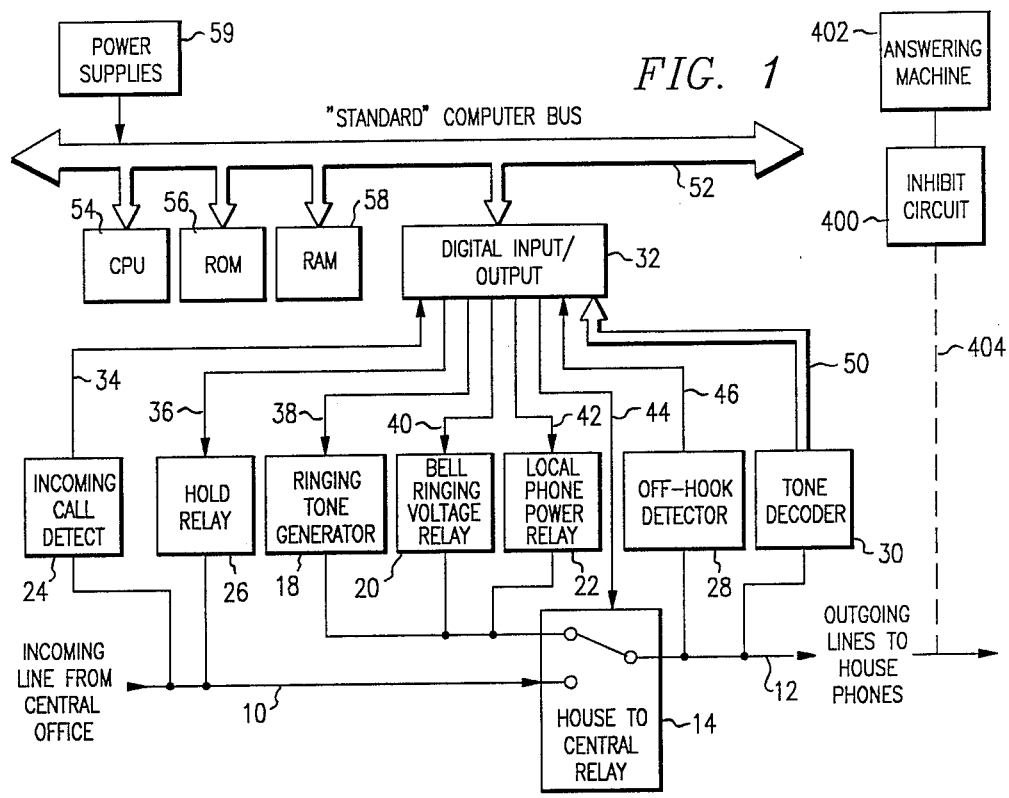
FIG. 1 is a block diagram of a device constructed in accordance with the invention.

Referring initially to FIG. 1, the device of the present invention is interposed between incoming line 10, which is a line from the phone system's central office, and outgoing line 12, which is connected to the extension telephones in the system. The typical telephone system includes a single incoming line 10 and multiple extensions connected in parallel to the incoming line 10. The device is interconnected with the incoming line 10 ahead of all extension telephones for which intercom features are desired.

House to central relay 14 is provided to disable the connection between incoming line 10 and outgoing line 12, thereby disconnecting the extension telephones from the incoming line 10. When actuated as shown in FIG. 1, relay 14 connects outgoing line 12 to a ringing tone generator 18, a bell ringing voltage relay 20, and a local phone power relay 22. An incoming call detector 24 and a hold relay 26 remain connected to incoming line 10 at all times. An off-hook detector 28 and a tone decoder 30 remain connected to outgoing line 12 at all times.

Incoming call detector 24 is connected to a digital input/output port 32 by signal line 34. The hold relay 26 is connected to port 32 by signal line 36. The ringing tone generator 18 is connected to port 32 by signal line 38. The bell ringing voltage relay 20 is connected to port 32 by signal line 40. The local phone power relay 22 is connected to port 32 by signal line 42. House to central relay 14 is connected to port 32 by signal line 44. The off-hook detector 28 is connected to port 32 by signal line 46. The tone decoder 30 is connected to port 32 by date line 50.

Port 32 provides digital data signals to bus 52, which is in turn connected to CPU 54, ROM 56, RAM 58, and power supplies 59 in conventional fashion. In the preferred embodiment, CPU 54 includes an Intel 8088 microprocessor in an Intersil Systems, Inc. ISB-3130 STD card. RAM 58 is 16K on an Intersil Systems, Inc. ISB-3250 card. ROM 56 is 8K on a Pro-Log 7507 card. Port 32 is a 24 signal, 5 volt discrete input/output unit and preferably includes a Pro-Log 7507 STD card. It will be readily recognized by those skilled in the art that the computer equipment of the preferred embodiment just described is substantially underused in terms of computer power and that it may be more desirable and cost effective to use an equivalent micro-controller such as an 8751 single chip 8 bit micro-controller manufactured by Intel.

Intercom capability is provided as follows. The user assigns each member of the residence or small business a ring burst signal code which will be used to alert the member to pick up the nearest telephone extension for an intercom conversation. For example, the father in a family is assigned a ring burst signal code of 1 ring burst, mother is assigned a signal of 2 ring bursts, daughter —3 ring bursts, and son —4 ring bursts. To alert a particular member of the family (or employee of a small business) to pick up a telephone extension, that particular member's code is pressed into the telephone keypad of one of the extensions. To initiate the intercom device, a first signal, such as "*", is first pressed followed by a second signal, such as a code number from 0 to 9. For example, to have father (or employee #1) pick up an extension, first and second signals "*1" are pressed, for mother (or employee #2)—"*2", for daughter—"*3", or for son—"*4". All telephone extensions in the house will give a sequence of short ringing sounds (bursts) corresponding to the code of the person entered into the keypad, the sequence beginning after the code is punched and the handset is returned to its cradle. Thus, the code to alert mother (or employee #2) to pick up the phone would be repeated bursts of two quick rings.

When the mother hears: "ring-ring . . . ring-ring . . . ", etc., she will pick up the phone. Once picked up, the ringing will stop and the father can pick up the phone to talk to the mother. To call son (code 4), "*4" would be pressed and the same routine followed.

In addition to the signalling function, the device must also disconnect the incoming line 10 from the extension telephones during intercom use so that a dial tone is not heard over the extensions during intercom use. In addition, the incoming line 10 should not sense that any of the phones are off-hook; otherwise, a busy signal would be received by incoming callers. During intercom use, the normal ringing at the extensions during an incoming call should be disabled, but a signal should be generated in the handsets so that the intercom users can terminate the intercom conversation and receive the incoming call, if desired.

The apparatus of FIG. 1 accomplishes the foregoing functions under computer control by CPU 54 in response to data signals from port 32. To initiate an intercom call, the initiator picks up a handset and presses a first signal, such as "*". Tone decoder 30 decodes the tones generated by pressing "*" and sends a signal through data line 50, port 32 and bus 52 to CPU 54. CPU 54 is programmed to energize house to central relay 14 through signal line 16 in response to "*" to the position shown in FIG. 1, where the incoming line 10 is disconnected from the outgoing line 12, and outgoing line 12 is connected to local phone power relay 22, bell ringing voltage relay 20, and ringing tone generator 18. Local phone power through relay 22 provides power to the extension phones to enable intercom use while incoming line 10 is disconnected. Once the second signal, such as a "2" for the mother of the family, is pressed (after pressing first signal "*" to energize relay 14), tone decoder 30 sends the resulting signal to CPU 54, which energizes bell-ringing voltage relay 20 to cause the appropriate ring burst sequence after off-hook detector 28 senses that the initiator's handset has been hung up. The ring burst sequence pattern ceases when the off-hook detector 28 next senses an off-hook condition, normally caused by the person being signalled picking up an extension. With local phone power being applied to the extensions, the intercom conversation can proceed when the initiator once again picks up his extension. CPU 54 can energize the hold relay 26 to place an incoming or outgoing caller on "hold" if required. In the event of an incoming call, incoming call detector 24 sends a signal along line 34 to CPU 54, which causes ringing tone generator 18 to place a ringing signal on all the extension handsets. If the intercom users wish to take the incoming call, they simply all hang up. Relay 14 then reverts to its normal condition where incoming line 10 is connected to outgoing line 12, and the incoming call rings the extensions.

The device also enables the users to interact with incoming and outgoing calls, in addition to the simple intercom function described above. The following scenarios can apply to either a residence or small business:

Incoming call transfer scenario—An incoming call is answered by father. The call is for mother so father uses the intercom to so indicate by pressing "*2" and hanging up. The incoming call is automatically put on hold, and all the extensions in the house begin to give intermittent two ring bursts. Mother hears her code from wherever she is in the house and answers a nearby telephone extension. The instant she picks up the receiver, the incoming call is reconnected. She can now talk to her party.

Outgoing call transfer scenario—An outgoing call is made by the son to a friend. After several minutes of talking to the friend, son wants to transfer the call to sister. He does this by pressing "*3" and hanging up. The friend is put on hold by the device while the telephone extensions begin sequences of three ring bursts. When daughter picks up an extension, she can now converse with the friend.

Incoming or outgoing call scenario with intercom—If, for example, a family member wishes to ask another person in the house a quick question while an outside caller is on hold, he can simply press "*" twice to signal the computer to first put the outside line on hold, then prepare to make an internal intercom call. For instance, if mother wants to ask father if he wants to go to dinner with their neighbors she can press "**1" and hang up. When father answers she can pick up the phone and ask the question without the outside caller hearing anything. Mother and father then both hang up and the phone will ring again. When the phone is picked up, their neighbor will be reconnected.

Put an incoming call on hold—A person may put a phone on hold to transfer to a more convenient phone by pressing "*" and then hanging up. If the person forgets to pick up another phone after a 90 second delay, the phone will ring until somebody picks up the handset. The outside caller will be reconnected when a phone is picked up. If "*" alone is pressed when no outgoing call or incoming call originated (i.e., intercom use), this is seen as a user error and the computer will clear and return the system back to normal.

Signalling—Signals can be worked out in the family, such as five rings meaning that a meal is being served. Mother can press in "*5" to signal that dinner is ready, hang up the phone, allow all phones to ring in bursts of 5, then briefly pick up the phone to stop the ringing.

Referring now to FIG. 2, incoming call detector 24 senses an incoming call when the device is in the intercom mode for the purposes of generating a ringing tone on the phone extension handsets and determining if an incoming call was received before the intercom is used. "Tip" portion 10a and "ring" portion 10b of incoming line 10 are connected to the incoming call detector, as well as "Incoming" signal line 34, which is connected to port 32 as described above. Integrated circuit 80 in the preferred embodiment is a Texas Instruments TCM 1520A ring detector device. Integrated circuit 80 has an input impedance which is greater than one megohm, which will prevent any interference with parallel "off-hook" telephones transmitting DTMF or voice frequencies. Integrated circuit 80 is activated by a ring voltage of 40 volts at 16 hertz to 150 volts at 68 hertz on incoming line 10. Resistor 82 is provided to limit current into the integrated circuit 80 during high voltage transients and aids in dial pulse rejection. Capacitor 84 blocks DC voltage in standby and aids in filtering dial pulses. Capacitor 84 also aids in immunity to tinkling of the bell when spurious voltage spikes occur somewhere on the incoming phone line 10. Capacitor 86 stores energy from the ring signal to power the 5 volt regulator built into the integrated circuit 80. Integrated circuit 80 generates a signal on line 88 upon detection of an incoming call, which signal is suitable to drive optocoupler 90 through current limiting resistor 92 connected to common line 94. The output of optocoupler 90 on line 96 is pulled high through resister 98. The output in turn feeds into "Incoming" signal line 34 connected to port 32 so that CPU 54 can determine if a call is coming in.

Figure 3:
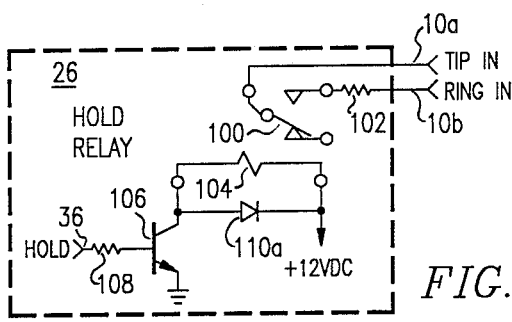
FIG. 3 is a schematic of the hold relay section of the device.

Referring now to FIG. 3, hold relay 26 includes relay arm 100 connected to incoming line portions 10a and 10b such that, upon energization, resistor 102 is placed directly across incoming line 10. Preferably, resistor 102 is approximately 500 ohms, which is approximately the same resistance as an off-hook telephone. An incoming call in progress, then, may be disconnected from the telephone extensions, but the call is not terminated due to the effect of resistor 102. Hold relay 26 is energized by "Hold" signal line 36 going high under control of CPU 54. Coil 104 of relay 26 is energized by switching transistor 106 and resistor 108 when line 36 goes high. Diode 110 are provided to absorb inductive energy spikes from the relay coil 104 when it is de-energized. These spikes, if not eliminated, will cause circuit errors.

Referring now to FIG. 4, bell ringing voltage relay 20, house to central relay 14, local phone power relay 22, ringing tone generator 18 and off-hook detector 28 are interconnected within the device. Relays 20, 22 and 14 each include a coil 104 and diode 110 as described above with respect to hold relay 26.

Ringing tone generator 18 places a ringing tone on the extension handsets when the intercom is in use and an incoming call is detected by incoming call detector 24. "Ringtone" signal line 38 is activated by CPU 54 in response to "Incoming" signal line 34 going high as described above in connection with FIG. 2. Integrated circuit 120 is preferably a Teltone M-991 call progress tone generator, and is hard wired to produce the dial tone frequencies composed of the sum of 350 hertz and 440 hertz. The output of integrated circuit 120 on line 122 is connected to current amplifier 124, which in turn drives isolation transformer 126 through line 128. Resistor 130, connected to output line 122, is a load resistor to prevent oscillation of integrated circuit 120. Crystal 132 produces a precise time base for frequency generation in integrated circuit 120. The output of ringing tone generator is placed on lines 134 and 136 leading to local phone power relay 22.

Handset hook status is detected by off-hook detector 28. Relay 150, preferably a Teltone M-949-01 line sense relay, closes when current above 20 mA flows through the outgoing phone line portions 12a and 12b. Relay 150 detects off-hook status regardless of whether the extensions are operating off of the central office or the local power supply. When ringing voltages are applied, relay 150 trips with every AC cycle going out to ring the extensions, which normally would cause many false off-hook signals. Thus, a low pass filter circuit including resistor 152 and capacitor 154 is provided to shunt the false off-hook signals. The output of relay 150 drives current amplifier 156 to eliminate the need for a load resistance on the output of relay 150 and to avoid detrimental relay arcing. The output of the low pass filter is fed into op-amp 158, which is configured as a voltage comparator. Voltage dividing resistors 160 and 162 provide a constant 3.33 volts to the other input of op-amp 158. When the extension phones ring, the low pass filter will filter the relay 150 output to a constant 2 volts. When an extension telephone is lifted off-hook either while the extension is ringing or between rings, the extension will draw at least 20 mA causing the relay 150 to remain on constantly. The output of the low pass filter will rise to about 4.5 volts, which is more than 3.33 volts, so the output of op-amp 158 will go high. The output of op-amp 158 feeds into another filter composed of resistor 164 and 166 to take out any off-hook transients. Diodes 168 and 170 are provided to clamp the op-amp's plus or minus 12 volt output swing to 0 to 5 volts on "Off-Hook" signal line 48 connected to port 32.

House to central relay 14 is provided to disconnect the house extensions from the central office incoming lines 10a and 10b. Relay 14 is energized by "House" signal line 16 through resistor 180 and switching transistor 182. Relay 14 is a DPDT relay having its arms 184 and 186 connected to outgoing lines 12a and 12b, respectively. Lines 12a and 12b feed through relay 150 of off-hook detector 28 described above to the extension telephones. When house to central relay 14 is in the condition shown in FIG. 4, lines 10a and 12a are connected and lines 10b and 12b are connected, thereby establishing normal operation of the telephone system. When relay 14 is energized, lines 12a and 12b are connected through arms 184 and 186 to local 48 VDC intercom power supply 188, local phone power relay 22 and either the 70 VAC ring voltage from bell ringing transactor 190 of bell ringing voltage relay 20 or the ringing tone generator 18. Bell ringing voltage relay 20 is activated by a high signal on "Bellvolt" signal line 40 through resistor 200 and switching transistor 202. Line 40 goes high in the sequence of ring bursts selected by the CPU. As shown in FIG. 4, the output of bell ringing voltage relay on lines 204 and 206 is normally fed to the "off" contacts of local phone power relay 22. Local phone power relay 22 is energized when line 208 from off-hook detector 28 goes high, signalling an off-hook condition. The "on" contacts of local phone power relay 22 are then connected to output lines 134 and 136 from ringing tone generator 18. Thus, when local phone power relay 22 is off, ringing voltages from bell ringing voltage relay 20 may be placed on outgoing lines 12a and 12b. When a handset is off hook, local phone power relay 22 is energized and only the ringing tone from ringing tone generator 18 can be sent to the extension telephones.

When a handset is taken off hook, DC current will be drawn because power supply 188 is in series with the ringing voltage provided by ringing voltage relay 20. Metal oxide varistor 220 is connected across outgoing lines 12a and 12b to dissipate the inductive energy of the bells in the extension telephones when relay 20 is de-energized and the ringing voltage is suddenly removed. Without varistor 220, very high energy would damage the contacts of relay 20 and cause logic chip failures.

Figure 5:
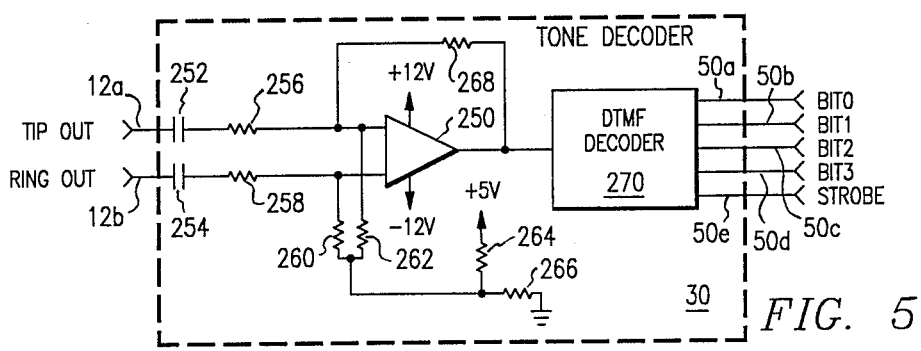
FIG. 5 is a schematic of the tone decoder section of the device.

Referring now to FIG. 5, tone decoder 30 is connected to outgoing lines 12a and 12b which are connected to the extension telephones. Each key on a touch-tone telephone produces a DTMF signal which is composed of the sum of a high and a low frequency. These signals are brought into tone decoder 30 through amplifier 250. AC coupling is provided through capacitors 252 and 254 and resistors 256 and 258. AC coupling is necessary, because outgoing lines 12a and 12b must be isolated from the device's circuits. Isolation is required, because the ground potential of lines 12a and 12b are usually different from the invention's logic ground. Biasing resistors 260, 262, 264, 266 and 268 are provided to keep the DC voltage into amplifier 250 at about 1 volt with a 0.7 volt signal swing. The output of amplifier 250 is fed into integrated circuit 270, which preferably is a Teltone M-957-01 Dual Tone Multifrequency decoder. Integrated circuit 270 uses frequency measuring techniques to decode touch tone keys into four-bit binary data on data lines 50a, 50b, 50c, and 50d. Preferably, the sensitivity control inputs of integrated circuit 270 are wired to provide a sensitivity of minus 24 dB. Integrated circuit 270 is also hard-wired so that the output is in hexidecimal form, the outputs are always enabled, and the internal clock is enabled. When a valid tone is decoded, "Strobe" data line 50e goes high, signalling CPU 54 to latch onto a number on data lines 50a ("Bit0"), 50b ("Bit1"), 50c ("Bit2"), and 50d ("Bit3"). CPU 54 will then read the data on lines 50a–50d and determine if the key pressed is a "*" or a number.

Figure 6:
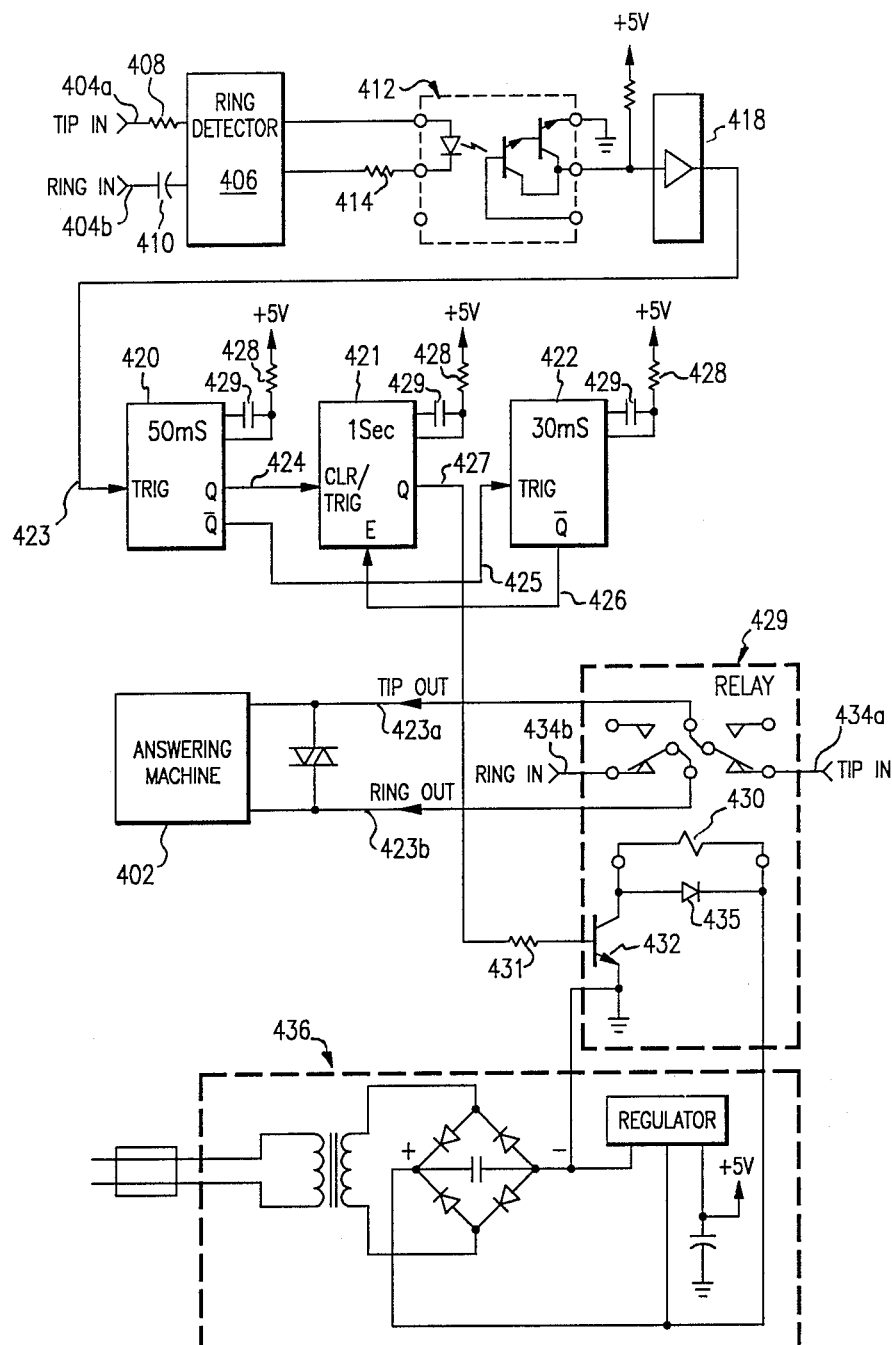
FIG. 6 is a schematic of an accessory for disabling an answering machine connected to the phone system during intercom use.

Referring now to FIGS. 1 and 6, an optional inhibit circuit 400 is connected between an answering machine 402 and lines 404a and 404b connected to the extension telephones. It has been found that the intercom device's short ringing bursts in the intercom mode will trip a normal answering machine, usually before a member of the residence or small business has a chance to answer the intercom signal. Circuit 400 allows only the last second of a standard two-second outside call's ringing voltage to get to answering machine 402. Outside calls are typically two seconds of ringing followed by a four second pause. The intercom device's ring bursts are preferably composed of one-half second on, one second off, followed by a two second pause. Circuit 400 causes answering machine 402 to sense only a one-second ringing voltage when an outside call comes in and no voltage when the device sends ringing voltage bursts.

Circuit 400 detects incoming ringing voltages by way of integrated circuit 406, which preferably is a Texas Instruments TCM 1520A Ring Detector coupled to lines 404a and 404b by resistor 408 and capacitor 410, respectively. The output of integrated circuit 406 is fed to opto-isolator 412 through resistor 414. The output of opto-isolator 412 is then fed into buffer 418, which insures that enough current is available from the ringing voltage signal to drive one-shot multivibrator 420. The output of buffer 418 is a signal of the same frequency as the ringing voltage, usually 20 to 30 hertz. This signal is fed into multivibrator 420, which has a pulse duration that lasts slightly longer than one 20 hertz cycle, or at least 50 milli-seconds. The output of multivibrator 420 remains high during the duration of the incoming ring voltage, because it is constantly being re-triggered before the output has a chance to go low from the preceding trigger. The output of multivibrator 420 triggers multivibrator 421 to go high for a one-second duration. When multivibrator 421 gets a signal from multivibrator 420 that an incoming ring has started, its output goes high immediately and stays high for the one-second duration. When the second has passed, the output of multivibrator 421 will go low even though the trigger signal from multivibrator 420 is still high. The clear-trigger line is used on multivibrator 421 so that the output will positively clear when there is no incoming ringing voltage. The output of multivibrator 421 is placed on line 427. The timing resistors 428 and capacitors 429 on each multivibrator are selected so that 50 milli-second, one second, and 30 milli-second pulses will occur when multivibrators 420, 421, and 422 respectively are triggered. Line 427 drives relay 430 through resistor 431 and switching transistor 432.

Multivibrator 422 is triggered by the negative going edge of the output of multivibrator 420. A negative edge will occur about 50 ms after the last ringing pulse occurs in a ring burst. Multivibrator 422 is tied into the enable of multivibrator 421 through line 426 so that the relay 430 will be inhibited from turning on for 30 milli-seconds after the ringing stops. When answering machine 402 answers after ringing stops, a small inductive spike will get back into the ring detector 406 which would trip relay 430 on if it were not for signal 426 to inhibit multivibrator 421. The relay would constantly re-trip such that the answering machine would never connect to the phone lines 434a and 434b. If the answering machine answers while a ringing voltage is still coming in, multivibrator 422 would not yet be triggered. An inductive spike would be added to the ringing voltage in. Multivibrator 420 is re-triggered by any transition whether it be inductive spikes or ringing voltage. Therefore, when answering machine 402 answers while a ringing voltage is still coming in, multivibrator 420 will still remain high so that multivibrator 421 will not be re-triggered. Since multivibrator 421 is not re-triggered, relay 430 will stay off and the inductive spikes will be allowed to settle over the phone lines 434. Diode 435 dissipates inductive energy when relay 430 de-energizes. Metal oxide varistor 437 helps to clamp inductive spikes coming in from the answering machine.

Relay 430 of circuit 400 simply disconnects lines 432a and 432b going to answering machine 402 from incoming lines 434a and 434b. Relay 430 is energized the instant an incoming ringing voltage appears, disconnecting the answering machine from the phone lines. If the ringing voltage is due to an incoming call, which lasts longer than one second, multivibrator 421 will deenergize the relay allowing the answering machine to receive the last second of the ring. If the ringing voltage has been generated by the intercom device, which ringing lasts only one-half second, answering machine 402 will not see any of the ringing voltage. An on-board power supply 436 is provided to power the logic and relay portions of circuit 400.

Software in ROM 56 is provided to enable CPU 54 to read the status of all signals required to control the device. A listing of the software for the preferred embodiment has been submitted as an appendix to the application for this patent and is incorporated herein by reference. The software can be readily adapted by those skilled in the art to various computers and micro-controllers usable in connection with the invention.

In the software, "Ringin" is a function that returns to the main program the status of the incoming phone line's ringing voltage. "Offhook" and "Onhook" are functions that return to the main program the status of whether or not the phone handsets are cradled. Several software flags keep track of the system's location in the intercom process. Basically, each time the phone is placed back on hook, another flag is set while the intercom is being used. When the last flag is set, the entire system clears itself and the system returns back to normal. Improper or repeated call transfers, intercom use, or holds will cause only a few flags to reset, backing the system up a few steps.

There are five main flags and several counters used in the software for the device.

The "remember call in" flag sets itself when a ringing voltage is detected coming into the house. This flag is also set if a key other than "*" is pressed first, signalling that an outgoing call was made before the intercom was used. The "remember call in" flag must be used in order to determine whether or not to put the caller (or one being called) on hold when trying to signal another house member that the call is for him. Also, it must be used to determine whether the house phones should be reconnected to the central office after the person answers their ring code or to leave the house isolated and use the invention's own internal supply for the intercom. This flag will automatically clear using a countdown timer if the person trying to call hangs up before somebody answers. The timer lasts long enough that the flag will not clear between rings. It will also clear when the intercom use cycle is over. The countdown timer will not decrement (thus, the "remember call in" flag will not clear) when the intercom is being used or the phone is off hook. This keeps the flag from inadvertently clearing while the call is being transferred, or the intercom is being used.

The "star" flag is set when the first signal, such as "*", is pressed on the telephone. When this flag is set, the user is using the intercom. In addition, the house is disconnected from the incoming line and placed on its own local intercom power. The flag is cleared and the house is reconnected to the central station after a call transfer has been answered, the second phone picked up after the phone is put on hold, or when everyone hangs up after using the intercom. While this flag is being set, the flags normally set later in the intercom cycle are cleared, allowing the user to do multiple transfers, intercom use, or holds without having to start all over. Without the ability to clear the flags which are normally set later, this powerful feature would not be possible. If the first signal "*" is pressed and the "remember call in" flag is set, the user can put the person on hold to move to another more convenient phone. It is also possible to press "* * 'number'" to make a quick intercom call to another member of the house while the outside caller is on hold. The entire device is reset back to the start if an error occurs when "*" is pressed and the "remember call in" flag is clear (no outside caller present).

The "hook" flag is set after the user presses "*" and a number (or "*" alone for hold) and the phone is back on hook. The hook flag merely keeps track of the midpoint in the cycle. The next time the handset is picked up, the last flag will be set because the "hook" flag has been set. Local ringing voltage will be placed onto the "tip" and "ring" lines at the required repetition rate to produce the desired ring burst signalling immediately before the "hook" flag is set.

The "last" flag is set after the person answers either the intercom or the call transfer. The entire system will be reset and the person connected to the incoming call if the "remember call in" flag is set from an earlier stage. This system reset will reconnect the house with the central office. If the "remember call in" flag is clear at this point, the house remains disconnected from the central station to allow the in-house intercom call. The tone generator will put a signal over the earpiece while the intercom is being used if there is an incoming call and the last flag is set. The phones will ring and behave normally allowing the call to be answered after all handsets have been placed back on hook and the CPU bus returned back to the initial starting state by clearing all flags and counters.

Whereas the present invention has been described with respect to a specific embodiment thereof, it will be understood that various changes and modifications will be suggested to one skilled in the art and it is intended to encompass such changes and modifications as fall within the scope of the appended claims.

I claim:

1. Apparatus for adding an intercom capability to a plurality of telephones connected in parallel to an incoming telephone company line, comprising:

an input connection for communication with the "tip" and "ring" wires of the telephone company line;

an output connection for communication with the "tip" and "ring" wires of lines leading to telephones having the intercom capability provided by the apparatus;

computing means;

a house to central relay responsive to the computing means being activated by a first keypad signal generated at any one of the telephones connected to the output connection, the house to central relay being disposed to disconnect the telephone company line when a first keypad signal is detected by the computing means on the lines connected to the telephones;

a hold relay responsive to the computing means to simulate an off-hook telephone on the telephone company line when the house to central relay has disconnected the telephone company line while a call is in progress;

a ringing voltage sequence generator responsive to the computing means being activated by detection of a second keypad signal from any one of the telephones connected to the output connection, the ringing voltage sequence generator generating a sequence of voltages corresponding to the second keypad signal to ring all the connected telephones with the sequence;

an intercom power supply for enabling voice communications over the connected telephones when the house to central relay has disconnected the telephone company line;

an incoming call signal generator responsive to the computing means being activated by means for detecting an incoming call, the incoming call signal generator causing a signal tone to be generated at the connected telephones when an incoming call is detected and the house to central relay has disconnected the telephone company line;

off-hook detect means in communication with the computing means for detecting when a connected telephone is off-hook;

the computing means being responsive to the off-hook detect means to activate the ringing voltage sequence generator to generate a sequence of ringing voltages when all connected telephones become on-hook after detection of a second signal and to terminate a ringing voltage sequence upon detection of an off-hook connected telephone; and the computing means being responsive to the off-hook detect means to deactivate the house to central relay and thereby reconnect the telephone company line after detection of an off-hook connected telephone during a ringing voltage sequence.

2. Apparatus for adding integrated hold and intercom features to multiple extension telephones connected in parallel to the "tip" and "ring" wires of a telephone company line, comprising:

a tone decoder for decoding pushbutton tones generated at extension telephones in the system;

a computer responsive to the tone decoder to signal a relay to disconnect the telephone company line when a predetermined "disconnect" pushbutton tone is decoded;

the computer including logic means for holding the telephone company line if a call was in progress when the "disconnect" pushbutton tone was decoded;

the computer being responsive to the tone decoder and the on-hook status of the extension telephones to cause the extension telephones to ring in a pattern in accordance with the next subsequent pushbutton tone decoded after the "disconnect" pushbutton tone is decoded, with the ringing commencing after the computer senses that all the extension telephones are on-hook;

the computer being responsive to the off-hook status of the extension telephones to cease the ringing when one of the extension telephones goes off-hook; and the computer including logic means for reconnecting the telephone company line and taking the telephone company line off hold if a call was in progress when the "disconnect" pushbutton tone was decoded.

3. The apparatus of claim 2 further comprising incoming call detecting means for detecting an incoming call when the telephone company line is disconnected, and the computer having logic means for causing a tone generator to generate tones at the extension telephones when an incoming call is detected.

* * * * *